G. E. FORRY.
GAS ENGINE.
APPLICATION FILED JUNE 22, 1914.
Reissued Sept. 26, 1916.
14,195.
3 SHEETS—SHEET 1.
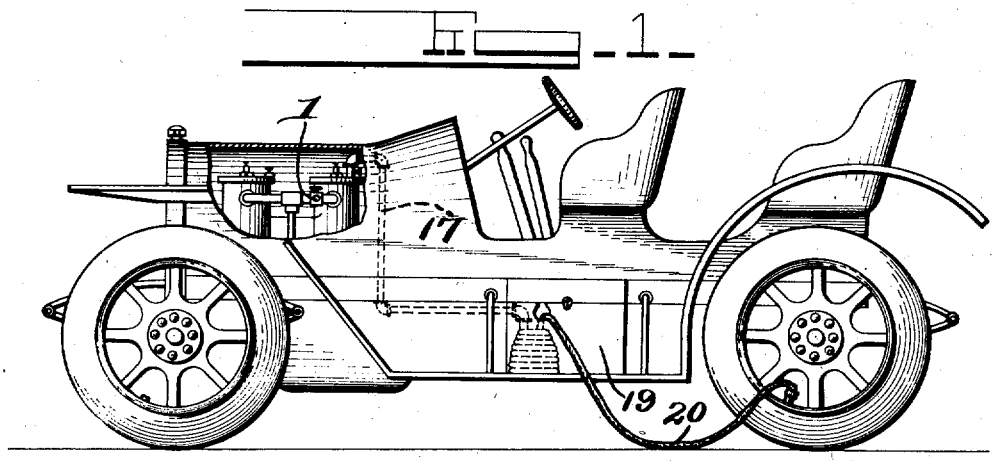
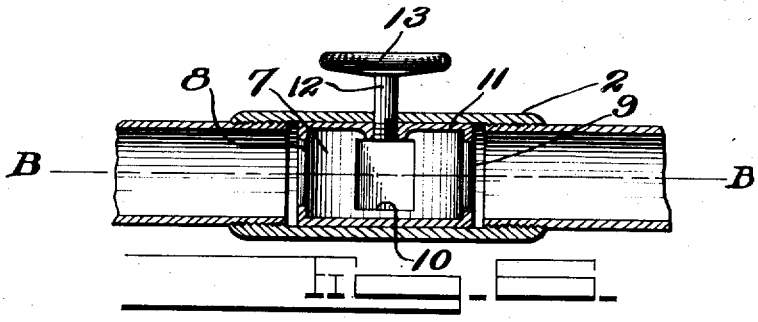
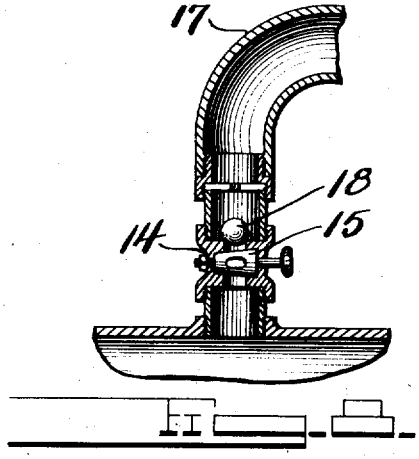
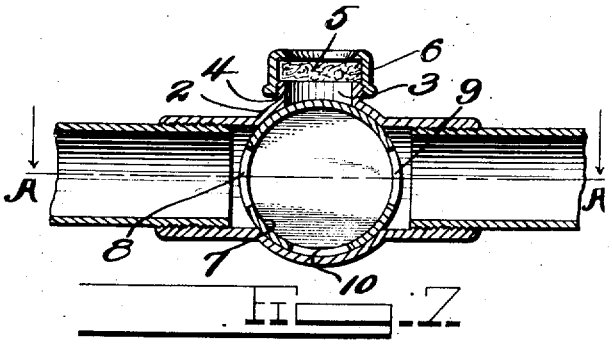
Witnesses
Jno. P. Woodworth
S. E. Davis
Inventor
G. E. Forry
By Langdon Morris
Attorney G. E. FORRY.
GAS ENGINE.
APPLICATION FILED JUNE 22, 1914.
Reissued Sept. 26, 1916.
14,195.
3 SHEETS—SHEET 2.
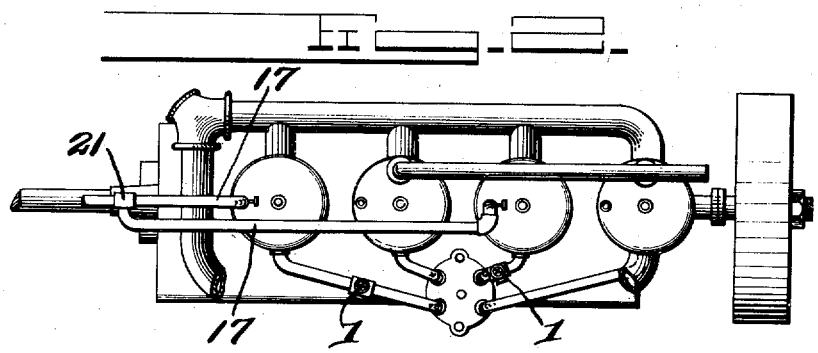
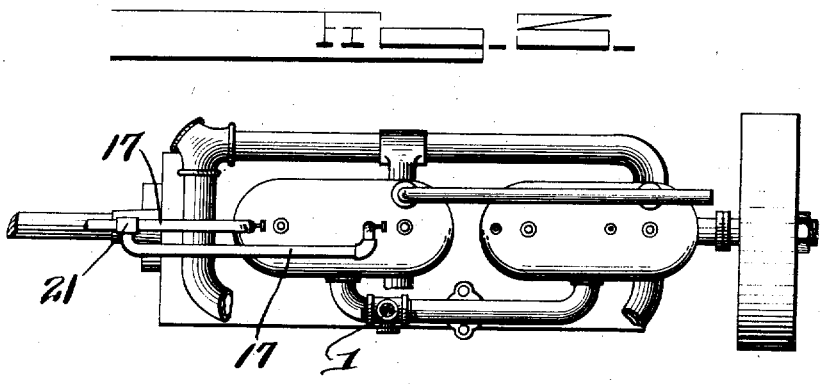
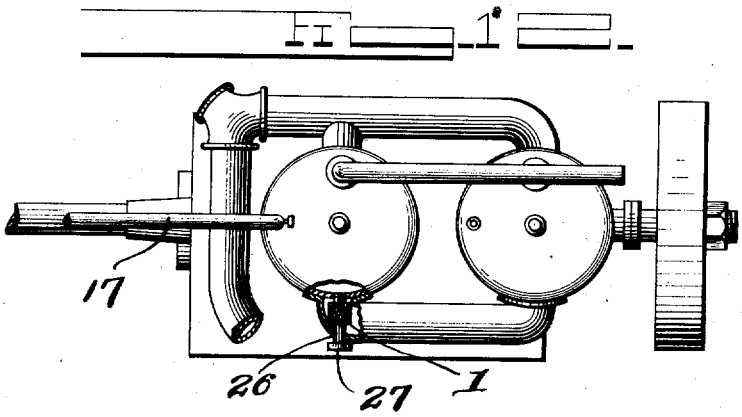
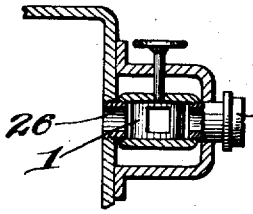
Witnesses
Jno. P. Woodworth.
S. E. Davis.
Inventor
G. E. Forry,
Langdon Thom
Attorney G. E. FORRY.
GAS ENGINE.
APPLICATION FILED JUNE 22, 1914.
Reissued Sept. 26, 1916.
14,195.
3 SHEETS—SHEET 3.
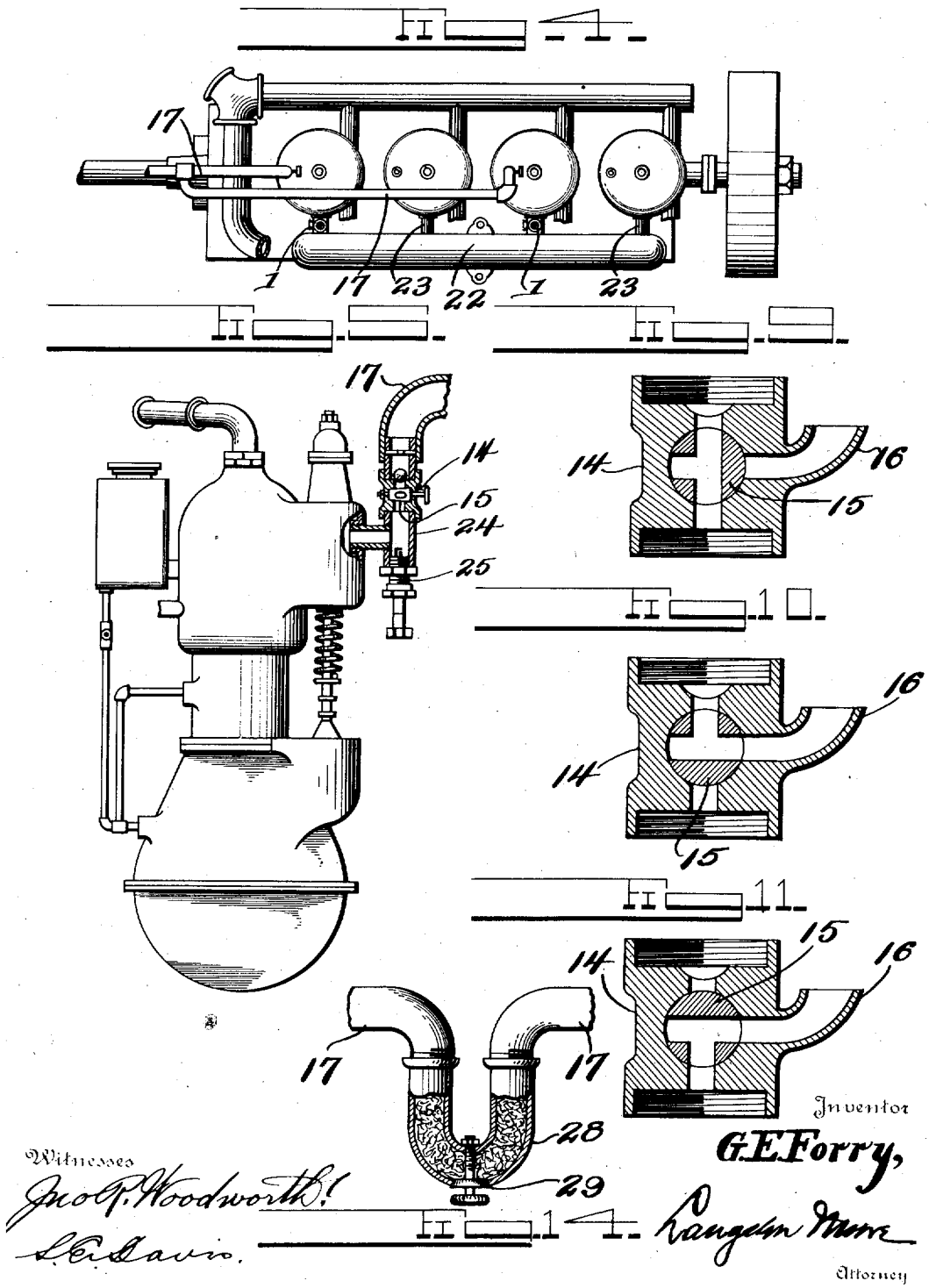
Witnesses
Jno. P. Woodworth.
L. E. Davis.
Inventor
G. E. Forry,
Langdon Morris
Attorney

UNITED STATES PATENT OFFICE.

GEORGE E. FORRY, OF HAGERSTOWN, MARYLAND, ASSIGNOR, BY DIRECT AND MESNE ASSIGNMENTS, TO MOTOR AIR PUMPING COMPANY, OF HAGERSTOWN, MARYLAND, A CORPORATION OF DELAWARE.

GAS-ENGINE.

14,195. Specification of Reissued Letters Patent. Reissued Sept. 26, 1916.

Original No. 1,043,583, dated November 5, 1912, Serial No. 631,122, filed June 3, 1911. Application for reissue filed June 22, 1914. Serial No. 846,709.

*To all whom it may concern:*

Be it known that I, GEORGE E. FORRY, a citizen of the United States, a resident of Hagerstown, in the county of Washington and State of Maryland, have invented new and useful Improvements in Gas-Engines, of which the following is a specification.

This invention relates to improvements in gas engines, and more particularly to a construction whereby one or more of the cylinders in a multiple cylinder gas engine may be converted into an air pump.

This invention is particularly contemplated for installation upon gas engines in automobiles and the compression stroke of the piston in one or more of the cylinders can be utilized in inflating the tires. The invention may as well be installed upon stationary engines when it is desired to compress air in a reservoir or for any other purpose.

The advantages of utilizing one or more of the cylinders upon an automobile for pumping up the tires by operating the engine while the automobile is stationary is obvious. The other applications to which this invention may be put in connection with other gas engines is also obvious.

While the preferred forms of this invention are illustrated in the accompanying sheets of drawing, yet it is to be understood that minor detail changes may be made without departing from the scope thereof.

All of the figures upon the drawing illustrate this invention as applied to automobile engines, yet it is also to be understood that this invention may be applied as well to other forms of gas engines having multiple cylinders and it is so contemplated as a part of this invention.

Figure 1 is a view in side elevation of any automobile with part of the hood broken away to disclose this invention as applied to a double cylinder engine. Fig. 2 is a view in top plan of a four cylinder engine to which this invention has been applied in which a separate mixture pipe leads from the carbureter to each cylinder. Fig. 3 is a similar view of a four cylinder engine in which the cylinders are cast in pairs and a single mixture pipe leads from the carbureter to each pair of cylinders. Fig. 4 is a similar view in which the mixture is led from the carbureter by a manifold connection to each cylinder. Fig. 5 is a view in side elevation of a multiple cylinder engine in which the spark plug is inserted in the side with parts broken away to illustrate the application of this invention to this form of engine. Fig. 6 is an enlarged detail view in vertical longitudinal section of an air inlet valve, taken upon lines A—A of Fig. 7, looking in the direction of the arrows. Fig. 7 is an enlarged detail view in horizontal longitudinal section of an air inlet valve, taken on the line B—B of Fig. 6. Fig. 8 is an enlarged detail view in vertical section through an air discharge valve. Figs. 9, 10, and 11 are enlarged sectional views taken at right angles to Fig. 8 illustrating the operation in detail of a part of an air discharge valve. Fig. 12 is a top plan view of a multiple cylinder engine in which the manifold from the carbureter makes a direct connection to each cylinder. Fig. 13 is a vertical sectional view showing the application of the air inlet valve to the form of engine shown in Fig. 13. Fig. 14 is a detail view partly in section of a strainer.

This invention contemplates in separating one of the cylinders of a multiple gas engine from the carbureter by placing a valve between the cylinder and the source of mixture by which the mixture may either be admitted to that cylinder or the mixture may be cut off and air admitted to that cylinder in its place. For the purpose of this application this valve will be termed the air inlet valve. Then if the engine is not already supplied with a pet cock by which the cylinder may be scavenged at times or may be primed when necessary, it will be supplied with a valve termed for the purpose of this application, an air discharge valve, otherwise this air discharge valve will be substituted for the pet cock. It will be noted that by this construction and arrangement this invention may be installed upon any multiple cylinder engine without any interference with the regular operation of the cylinder or regular intake and exhaust valves or the ignition system. The general operation of the air inlet and air discharge valves will be explained and then their application to the different forms of multiple cylinder engines and their operation in converting one or more cylinders into an air pump.

The air inlet valve 1 comprises a casing 2 adapted to be inserted in the mixture supply pipe at any convenient point between the cylinder and carbureter. As shown in Fig. 7 the casing is in direct communication with the supply pipe at each end and is provided at one side with a port 3 opening to the atmosphere. This port is preferably provided with an outstanding flange or rim 4 to which is secured an air strainer 5, preferably comprised of hair held in place between fine wire mesh or screening by a circular cap 6 engaging the outer mesh or screening and the flange or rim 4. The central portion of the valve 1 is preferably cylindrical in horizontal section and within this cylindrical portion is rotatably mounted a hollow valve member 7. The side walls of the valve member 7 are provided with three ports 8, 9, and 10, and the top 11 is provided with a central valve stem 12 and hand wheel 13. Two of the ports 8 and 9 are arranged diametrically opposite and the third port 10 on one side intermediate between them so that when in the position shown in Figs. 6 and 7 the mixture will be free to flow freely from the carbureter to the cylinder and the air port 3 will be closed by the solid side wall of the valve member 7. By rotating the hand wheel 13 a quarter of a turn in one direction one of the ports will register with the air port 3 and another port with the supply pipe while the opposite connection to the supply pipe will be closed by the solid wall of valve member 7. By proper arrangement of the ports 8, 9, and 10 the supply from the carbureter may be cut off and the cylinder opened to the atmosphere through the air port 3. A stop may be placed to prevent rotation of the valve member 7 in the opposite direction so as to prevent the carbureter being opened to the atmosphere.

The cylinders of most gas engines are supplied with a pet cock for scavenging and priming the cylinders and in such case the regular pet cock is exchanged for the one shown in Figs. 8, 9, 10, and 11 in connection with the air discharge valve shown in Fig. 8, otherwise the air discharge valve and pet cock are attached at a convenient point to the upper part of the cylinder. The pet cock 14 is provided with a three way valve member 15 having one port leading directly therethrough and another port leading therefrom at right angles thereto, and a priming cup 16 is provided upon one side leading into the valve intermediate the straight through passage. From the top of the pet cock valve leads an air pipe 17. At the point of connection between the pet cock 14 and the air pipe 17 a check valve 18 of preferably the ball type is provided. When the pet cock 14 is in the position shown in Fig. 9 the air pipe 17 will be in direct communication with the interior of the cylinder. When the pet cock 14 is in the position shown in Fig. 10 the communication to the cylinder will be entirely closed and when in the position shown in Fig. 11 the interior of the cylinder will be in communication with the atmosphere through the priming cup 16.

Fig. 1 shows an automobile provided with a two cylinder engine having a mixture pipe leading from each cylinder to the carbureter. In this type of engine to accomplish the object of this invention an air inlet valve 1 is placed in the mixture pipe between one cylinder and carbureter and that cylinder is provided with the air discharge valve. The air pipe preferably follows the frame of the automobile and terminates in the tool box 19 where a rubber tube or hose 20 may be attached to lead to the valves upon the different tires. When it is desired to inflate a tire the hose and tube are connected to that tire, the air inlet valve operated to admit air into the cylinder and the air discharge valve operated to connect the air tube 20 and air pipe 17 to the interior of the cylinder and the engine started and operated by the other cylinder. As the regular operating valves of the cylinders have not been altered one cylinder will operate as usual while the other as the mixture intake valve rises will draw in air through the air intake valve and the compression stroke of the piston will discharge the compressed air through the air discharge valve, the air pipe and hose or air tube into the tire.

Fig. 2 illustrates a four cylinder engine having a separate mixture supply pipe leading from the carbureter to each cylinder. In such an arrangement it is preferable to insert the air inlet valve 1 in the mixture pipes leading to the alternate cylinders and providing these alternate cylinders with the air discharge valves and then connect the air pipes 17 from these valves as at 21.

Fig. 3 shows a four cylinder engine having the cylinders cast in pairs and a single mixture supply pipe leading to each pair. In this form the air inlet valve is placed in one mixture supply pipe between the carbureter and one pair and that pair provided with air discharge valves and air pipes 17 connected as at 21.

Fig. 4 shows a four cylinder engine having four separate cylinders but each cylinder connected with the carbureter through a manifold mixture supply 22. Each cylinder is connected by an individual pipe 23 to the manifold and in such a case the air inlet valves are placed in the alternate pipes 23 and these cylinders connected in the same manner as in Fig. 2.

Fig. 5 shows the application of this invention to an engine having the spark plug inserted in the side of the cylinder or mixture intake valve and having the top of the cylinder inclosed within the water jacket. In this form a T-joint 24 having the tail member the same size as the spark plug is placed in the cylinder in lieu of the spark plug and the spark plug 25 inserted in one side and the air discharge valve in the other end as shown. The air inlet valve is placed between the cylinder and carbureter in the manner shown upon the other figures.

In some gas engines the manifold makes a direct connection to each cylinder and in this case it is necessary to place a pipe 26 in the mixture intake port of one cylinder which pipe leads through the manifold to the atmosphere as at 27. The air inlet valve 1 is placed in the pipe 26 with the valve stem 12 extending therethrough and arranged so that the side opening will communicate with the interior of the manifold and then straight through ports will connect the cylinder to the air through the opening 27 in the pipe 26.

In some cases the ordinary pet cock is not provided and only the spark plug opening is provided in the cylinder head. In such a construction this invention is applied in the same manner as shown on Fig. 5. If found more convenient an L-joint may be substituted for the T-joint in which one arm is secured in the spark plug orifice with the air discharge valve in the other arm and the spark plug inserted at the juncture of the two arms.

If desired a hair strainer 28, Fig. 14, may be placed in the air discharge pipe 17, to catch any oil or grease carried over from the cylinder. The strainer is preferably U shaped and provided at the bottom with a draining valve 29.

What I claim is:

1. In a device of the character described, an air inlet valve in the mixture supply pipe between the source and a cylinder, and that cylinder provided with a pet cock having a three way valve leading to the atmosphere in one position, an air pipe connection, a check valve and a port in the valve connecting the air pipe with the cylinder.

2. In a device of the character described, an air inlet valve in the mixture supply pipe between the source and a cylinder, and that cylinder provided with an attachment adapted to be inserted in the spark plug orifice in said cylinder comprising a chamber, a spark plug entering therein, a pet cock in communication therewith, an air pipe connection, and a check valve between the air pipe and pet cock.

GEORGE E. FORRY.

Witnesses:

FRANKLIN W. LEVERING,

LANGDON MOORE.